(12) United States Patent
Farley et al.

(10) Patent No.: US 9,072,049 B2
(45) Date of Patent: Jun. 30, 2015

(54) RECEIVER STATE ESTIMATION IN A DUTY CYCLED RADIO

(75) Inventors: Matthew John Farley, Los Angeles, CA (US); LaMonte Peter Koop, Alpharetta, GA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/620,171

(22) Filed: Sep. 14, 2012

(65) Prior Publication Data

US 2013/0070657 A1    Mar. 21, 2013

Related U.S. Application Data

(63) Continuation of application No. 12/647,672, filed on Dec. 28, 2009, now Pat. No. 8,391,435.

(60) Provisional application No. 61/140,884, filed on Dec. 25, 2008.

(51) Int. Cl.
*G08C 17/00* (2006.01)
*H04W 52/02* (2009.01)

(52) U.S. Cl.
CPC ................................ *H04W 52/0235* (2013.01)

(58) Field of Classification Search
None
See application file for complete search history.

(56) References Cited

U.S. PATENT DOCUMENTS

| | | | |
|---|---|---|---|
| 6,239,690 B1* | 5/2001 | Burbidge et al. | 340/10.33 |
| 7,600,137 B2* | 10/2009 | Trappeniers et al. | 713/310 |
| 8,175,109 B2* | 5/2012 | Nogueira-Nine et al. | 370/447 |
| 8,188,764 B2* | 5/2012 | Weiss et al. | 326/86 |
| 8,514,758 B2* | 8/2013 | De Kimpe et al. | 370/311 |
| 8,531,268 B2* | 9/2013 | Ghabra et al. | 340/5.61 |
| 8,619,652 B2* | 12/2013 | Singh et al. | 370/311 |
| 2010/0166113 A1* | 7/2010 | Farley et al. | 375/316 |
| 2011/0138044 A1* | 6/2011 | Bailey et al. | 709/225 |
| 2011/0176465 A1* | 7/2011 | Panta et al. | 370/311 |
| 2012/0077434 A1* | 3/2012 | Royston | 455/41.1 |
| 2012/0163422 A1* | 6/2012 | Lee et al. | 375/211 |
| 2012/0190390 A1* | 7/2012 | Reunamaki et al. | 455/500 |

* cited by examiner

*Primary Examiner* — Otis L Thompson, Jr.
(74) *Attorney, Agent, or Firm* — Morris & Kamlay LLP

(57) ABSTRACT

A method for receiver state estimation includes communicating, from a first communications device to a second communications device, a first plurality of wake-up frames; receiving, at the first communications device from the second communications device, an indication of a received wake-up frame of the communicated first plurality of wake-up frames; determining, by the first communications device, a time at which the second communications device is in a ready state based on the received indication; subsequently communicating, from the first communications device to the second communications device, a second plurality of wake-up frames. The first plurality is greater than the second plurality, the reduction in number from the first plurality to the second plurality being based on the determined time at which the second communications device is in a ready state.

20 Claims, 1 Drawing Sheet

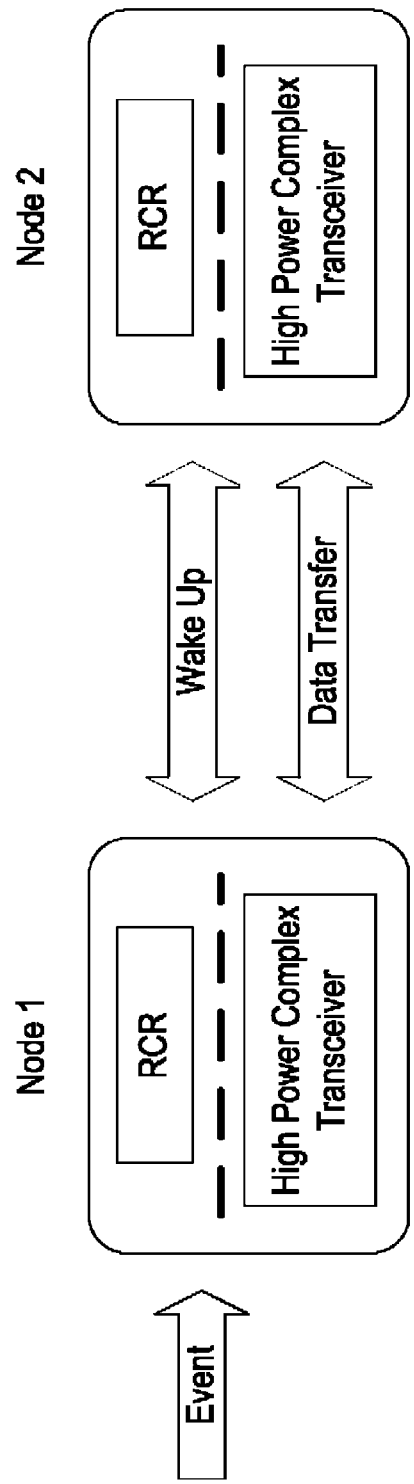

RECEIVER STATE ESTIMATION IN A DUTY CYCLED RADIO

CROSS-REFERENCE TO RELATED APPLICATION

The present application is a U.S. continuation patent application of, and claims priority under 35 U.S.C. §120 to, U.S. nonprovisional patent application Ser. No. 12/647,672, filed Dec. 28, 2009 now U.S. Pat. No. 8,391,435, which nonprovisional patent application published as U.S. patent application publication no. 2010/0166113, which patent application and any patent application publications thereof are incorporated by reference herein, and which '672 application is a U.S. nonprovisional patent application of, and claims priority under 35 U.S.C. §119(e) to, U.S. provisional patent application Ser. No. 61/140,884, filed Dec. 25, 2008, which provisional patent application is hereby incorporated herein by reference, and a copy of which is included in Appendix D attached hereto, which is hereby incorporated herein by reference.

INCORPORATION BY REFERENCE

Additionally, the present application hereby incorporates herein by reference each of the following identified U.S. patent applications—as well as any publications thereof and any patents issuing therefrom; the following identified U.S. patent application publications; and the following identified U.S. patents: Ser. Nos. 12/607,040; 12/609,009; 12/609,008; 12/608,837; 12/468,047; 12/367,544 (US 2009-0135000 A1); Ser. No. 12/367,543 (US 2009-0161642 A1); Ser. No. 12/367,542 (US 2009-0181623 A1); Ser. No. 12/353,197 (US 2009-0129306 A1); Ser. No. 12/352,992 (US 2009-0122737 A1); Ser. No. 12/343,865 (US 2009-0104902 A1); Ser. No. 12/343,822 (US 2009-0103462 A1); Ser. No. 12/271,850 (US 2009-0092082 A1); Ser. No. 12/140,253 (US 2008-0303897 A1); Ser. No. 11/930,797 (US 2008-0151850 A1); Ser. No. 11/930,793 (US 2008-0112378 A1); Ser. No. 11/930,788 (US 2008-0165749 A1); Ser. No. 11/930,785 (US 2008-0143484 A1); Ser. No. 11/930,782 (US 2008-0212544 A1); Ser. No. 11/930,779 (US 2008-0129458 A1); Ser. No. 11/930,777 (US 2008-0111692 A1); Ser. No. 11/930,770 (US 2008-0144554 A1); Ser. No. 11/930,761 (US 2008-0112377 A1); Ser. No. 11/930,753 (US 2008-0142592 A1) now U.S. Pat. No. 7,535,339; Ser. No. 11/930,749 (US 2008-0130536 A1) now U.S. Pat. No. 7,538,658; Ser. No. 11/930,740 (US 2008-0150723 A1) now U.S. Pat. No. 7,538,657; Ser. No. 11/930,736 (US 2008-0143483 A1) now U.S. Pat. No. 7,538,656; Ser. No. 11/847,309 (US 2007-0291724 A1); Ser. No. 11/847,295 (US 2007-0291690 A1); Ser. No. 11/832,998 (US 2007-0273503 A1) now U.S. Pat. No. 7,378,959; Ser. No. 11/832,991 (US 2007-0268134 A1) now U.S. Pat. No. 7,378,958; Ser. No. 11/832,979 (US 2007-0268126 A1) now U.S. Pat. No. 7,378,957; Ser. No. 11/610,427 (US 2007-0159999 A1); Ser. No. 11/618,931 (US 2007-0155327 A1); Ser. No. 11/555,173 (US 2007-0099629 A1); Ser. No. 11/555,164 (US 2007-0099628 A1); Ser. No. 11/465,466 (US 2007-0043807 A1); Ser. No. 11/465,796 (US 2007-0041333 A1); Ser. No. 11/460,976 (US 2008-0315596 A1); Ser. No. 11/428,536 (US 2007-0002793 A1); Ser. No. 11/428,535 (US 2007-0002792 A1); Ser. No. 11/425,047 (US 2007-0069885 A1) now U.S. Pat. No. 7,554,442; Ser. No. 11/425,040 (US 2006-0287008 A1) now U.S. Pat. No. 7,539,520; Ser. No. 11/424,850 (US 2007-0004331 A1); Ser. No. 11/424,849 (US 2007-0004330 A1) now U.S. Pat. No. 7,574,168; Ser. No. 11/424,847 (US 2007-0001898 A1) now U.S. Pat. No. 7,583,769; Ser. No. 11/424,845 (US 2006-0287822 A1) now U.S. Pat. No. 7,574,300; Ser. No. 11/423,127 (US 2006-0289204 A1) now U.S. Pat. No. 7,563,991; Ser. No. 11/422,306 (US 2006-0282217 A1) now U.S. Pat. No. 7,542,849; Ser. No. 11/422,304 (US 2006-0276963 A1) now U.S. Pat. No. 7,526,381; Ser. No. 11/422,321 (US 2006-0276161 A1); Ser. No. 11/422,329 (US 2006-0274698 A1) now U.S. Pat. No. 7,529,547; Ser. No. 11/306,765 (US 2008-0136624 A1) now U.S. Pat. No. 7,394,361; Ser. No. 11/306,764 (US 2006-0237490 A1) now U.S. Pat. No. 7,391,321; Ser. No. 11/193,300 (US 2007-0024066 A1) now U.S. Pat. No. 7,438,334; Ser. No. 11/161,550 (US 2007-0002808 A1) now U.S. Pat. No. 7,430,437; Ser. No. 11/161,545 (US 2006-0018274 A1) now U.S. Pat. No. 7,221,668; Ser. No. 11/161,542 (US 2006-0023679 A1) now U.S. Pat. No. 7,522,568; Ser. No. 11/161,540 (US 2007-0004431 A1) now U.S. Pat. No. 7,200,132; Ser. No. 11/161,539 (US 2006-0023678 A1) now U.S. Pat. No. 7,209,468; Ser. No. 10/987,964 (US 2005-0093703 A1) now U.S. Pat. No. 7,155,264; Ser. No. 10/987,884 (US 2005-0093702 A1) now U.S. Pat. No. 7,133,704; Ser. No. 10/604,032 (US 2004-0082296 A1) now U.S. Pat. No. 6,934,540; Ser. No. 10/514,336 (US 2005-0215280 A1) now U.S. Pat. No. 7,209,771; and Ser. No. 09/681,282 (US 2002-0119770 A1) now U.S. Pat. No. 6,745,027.

Each of the foregoing patent application publications and patents is hereby incorporated herein by reference for purposes of disclosure of class-based network (CBN) technology, wake-up (WU) technology, and class-based networks that utilize such technologies (such as those of TeraHop Networks, Inc. of Alpharetta, Ga.), and systems employing such technologies including, inter alia: (1) implementations in the first responder context; (2) implementations in container tracking and monitoring context; and (3) implementations in equipment tracking and monitoring, especially rental construction equipment. It is intended that the CBN and WU technologies, and related features, improvements, and enhancements, as disclosed in these incorporated references may be utilized in combination with various embodiments and implementations of the present invention.

Further still, "Ad Hoc Wireless Networks", by C. Siva Ram Murthy and B. S. Manoj, is hereby incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to systems and methods for reducing power consumption and congestion in wireless networks.

At least some methods and systems described herein could be considered a refinement of "Receiver with constant battery saving duty cycle" (U.S. Pat. No. 5,355,518) to reduce power consumption and bandwidth usage. Other US patents that describe similar techniques include: U.S. Pat. No. 4,964,121 for a "Battery saver for a TDM system"; U.S. Pat. No. 5,355,518 for a "Receiver with constant battery saving duty cycle"; and U.S. Pat. No. 4,802,240 for a "Synchronous receiving method for selective calling signal".

A need exists for improvement in power consumption and congestion associated with wireless networks. This, and other needs, are addressed by one or more aspects of the present invention.

SUMMARY OF THE INVENTION

The present invention includes many aspects and features. Moreover, while many aspects and features relate to, and are described in, the context of systems and methods for reducing power consumption and congestion in wireless networks, the present invention is not limited to use only in such systems and methods, as will become apparent from the following summaries and detailed descriptions of aspects, features, and one or more embodiments of the present invention.

Accordingly, one aspect of the present invention relates to a method for receiver state estimation. The method includes communicating, from a first communications device to a second communications device, a first plurality of wake-up frames; receiving, at the first communications device from the second communications device, an indication of a received wake-up frame of the communicated first plurality of wake-up frames; determining, by the first communications device, a time at which the second communications device is in a ready state based on the received indication; subsequently communicating, from the first communications device to the second communications device, a second plurality of wake-up frames. The first plurality is greater than the second plurality, the reduction in number from the first plurality to the second plurality being based on the determined time at which the second communications device is in a ready state.

In a feature of this aspect of the invention, the first communications device and the second communications device each comprise a remote sensor node (RSN).

Another aspect of the present invention relates to a method for receiver state estimation. The method includes communicating, from a first communications device to a second communications device, a first plurality of wake-up frames; receiving, at the first communications device from the second communications device, an indication of a received wake-up frame of the communicated first plurality of wake-up frames; determining, by the first communications device, an offset time relative to a clock of the first communications device based on the received indication; subsequently communicating, from the first communications device to the second communications device, a second plurality of wake-up frames. The first plurality is greater than the second plurality, the reduction in number from the first plurality to the second plurality being based on the determined offset time.

In one or more embodiments, aspects and features described herein are utilized in combination with aspects and features described in one or more of the patents, publications, or applications incorporated herein by reference.

In addition to the aforementioned aspects and features of the present invention, it should be noted that the present invention further encompasses the various possible combinations and subcombinations of such aspects and features.

BRIEF DESCRIPTION OF THE DRAWINGS

One or more preferred embodiments of the present invention now will be described in detail with reference to the accompanying drawings, wherein the same elements are referred to with the same reference numerals, and wherein, FIG. 1 illustrates a high level overview of wireless nodes including both a reduced complexity radio, and a high power complex transceiver.

DETAILED DESCRIPTION

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

FIG. 1 illustrates a high level overview of wireless nodes including both a reduced complexity radio (RCR), and a high power complex transceiver. Preferably, each node is configured to receive a wake-up message via the RCR, that can then power up the high power complex transceiver for data transfer.

In preferred implementations, a duty-cycled receiver comprises a receiver which may be in either an idle or ready state, and will alternate periods of idleness and activity. To send a message to the receiver without any knowledge of when the receiver will be ready, other than the period, a sender must prefix multiple copies of a wake-up message for a duration equal to or greater than the period of the receiver's duty cycle. Preferably, these wake-up messages are numbered in descending order, such that when the number of the wake-up message reaches zero, the data intended for the receiver will be transmitted.

Upon reception of a message, the receiver immediately replies to acknowledge reception of the data. In a preferred implementation utilizing receiver state estimation, the receiver also indicates the number of the first wake-up message received. The transmitter then calculates, to some accuracy, the time at which the receiver is in a ready state. Given that the ready state of the receiver occurs on a known periodic basis, any future time at which the receiver will be ready can be calculated, within the limits of the available time-base.

If the time at which the receiver becomes ready can be estimated to within a time less than the period of the receiver duty-cycle, fewer wake-up transmissions must be prefixed to future data transmissions. This can save power by using fewer transmissions, and can additionally reduce congestion.

Such preferred methodologies reduce the power cost to the sender and bandwidth cost to the system when compared to a straightforward wake-up radio system. This method can be utilized separate from, or in combination with, aspects and features of wake-up transceiver (WU) technology patented by TeraHop Networks, Inc. (see U.S. Pat. No. 7,209,771, incorporated above by reference, and the patents related thereto), or other known wake-up technology and methodologies. This method also overcomes the need for maintenance in a strictly synchronized network.

Turning to another example, consider an implementation involving remote sensor nodes (RSNs). Each RSN includes a wake-up receiver, and transmissions to RSNs are preambled with wake-up attention (WU_ATTN) frames. In a preferred implementation, a receiving RSN indicates to a transmitting RSN a received WU_ATTN frame, thus allowing a relative time offset of the receiving RSN's receiving window to be known. Subsequent transmissions to the receiving RSN can utilize fewer WU_ATTN frames, within the limits of the RSN's timebase tolerances.

For example, WU_ATTN packets might be spaced 274.7 µs apart, and might be transmitted for 105 ms. Thus, the number of WU_ATTN packets sent would be 105 ms/274.7 µs, or 382. If, however, the receiving RSN indicates that it received WU_ATTN packet number 75, then the transmitting RSN can utilize this knowledge to calculate when the receiving RSN received the packet relative to the transmitting RSN's clock. This offset time can be stored and subsequently used to reduce the number of WU_ATTN packets utilized to wake up that RSN. In subsequent transactions, 1/5, or less, WU_ATTN frames can be utilized. Notably, a frame number of a received WU_ATTN frame is preferably still sent back by the receiving RSN, thus allowing for further refinement of a time offset.

Appendix C, which is hereby incorporated herein by reference, comprises additional disclosure of one or more implementations utilizing RSNs.

Alternatively, or additionally, an embodiment in accordance with the present invention could be implemented utilizing a Chipcon CC2500 Transceiver, sold by Texas Instruments (see Appendix A, which is hereby incorporated herein by reference), by utilizing a timer feature of the CC2500. Further detail can be found in Note AN047 of Appendix B, which is hereby incorporated herein by reference.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A communications device comprising:
a receiver;
a transmitter; and
a processor;
wherein the communications device is configured to:
  communicate to a second communications device a first plurality of wake-up frames,
  receive, from the second communications device in response to the communicated first plurality of wake-up frames, an indication of a received wake-up frame of the communicated first plurality of wake-up frames,
  determine, utilizing the processor, a time at which the second communications device is in a ready state based on the received indication, and
  subsequently communicate to the second communications device a second plurality of wake-up frames, wherein the first plurality is greater than the second plurality, the reduction in number from the first plurality to the second plurality being based on the determined time at which the second communications device is in a ready state.

2. The communications device of claim 1, wherein the communications device further comprises a sensor.

3. The communications device of claim 1, wherein the receiver and transmitter are each part of a transceiver.

4. The communications device of claim 1, wherein the communications device comprises a remote sensor node.

5. The communications device of claim 1, wherein the communications device further includes sensor data stored in memory of the communications device.

6. The communications device of claim 1, wherein the wake-up frames comprise wake-up messages.

7. The communications device of claim 1, wherein the wake-up frames of the second plurality of wake-up frames are numbered in descending order.

8. The communications device of claim 7, wherein the communications device is further configured such that, after the numbering of the wake-up frames has descended to zero, a message is transmitted.

9. A communications device comprising:
a receiver;
a transmitter; and
a processor;
wherein the communications device is configured to:
communicate to a second communications device a first plurality of wake-up frames,
receive, from the second communications device in response to the communicated first plurality of wake-up frames, an indication of a received wake-up frame of the communicated first plurality of wake-up frames,
determine, utilizing the processor, an offset time relative to a clock of the communications device based on the received indication, and
subsequently communicate to the second communications device a second plurality of wake-up frames,
wherein the first plurality is greater than the second plurality, the reduction in number from the first plurality to the second plurality being based on the determined offset time.

10. The communications device of claim 9, wherein the communications device is configured to store determined offset times.

11. The communications device of claim 9, wherein the communications device further comprises a sensor.

12. The communications device of claim 9, wherein the receiver and transmitter are each part of a transceiver.

13. The communications device of claim 9, wherein the communications device comprises a remote sensor node.

14. The communications device of claim 9, wherein the communications device further includes sensor data stored in memory of the communications device.

15. The communications device of claim 9, wherein the wake-up frames comprise wake-up messages.

16. The communications device of claim 9, wherein the wake-up frames of the second plurality of wake-up frames are numbered in descending order.

17. The communications device of claim 16, wherein the communications device is further configured such that, after the numbering of the wake-up frames has descended to zero, a message is transmitted.

18. A system, comprising:
a first communications device configured to communicate, to a second communications device, a first plurality of wake-up frames;
a second communications device configured to, based upon receipt of one or more wake-up frames of the first plurality of wake-up frames, communicate an indication of a received wake-up frame to the first communications device;
wherein the first communications device is further configured to
determine an offset time relative to a clock of the first communications device based on the received indication, and
subsequently communicate to the second communications device, a second plurality of wake-up frames;
wherein the first plurality is greater than the second plurality, the reduction in number from the first plurality to the second plurality being based on the determined offset time.

19. The system of claim 18, wherein the first communications device and the second communications device each comprise a remote sensor node (RSN).

20. The communications device of claim 18, wherein the wake-up frames of the second plurality of wake-up frames are numbered in descending order.

* * * * *